MOREAU & ROBERT.
Apparatus for Marbling Soap.

No. 45,164.

Patented Nov. 22, 1864.

WITNESSES:

INVENTOR:

UNITED STATES PATENT OFFICE.

F. MOREAU AND F. ROBERT, OF NEW YORK, N. Y.

IMPROVED APPARATUS FOR MARBLING SOAP.

Specification forming part of Letters Patent No. 45,164, dated November 22, 1864.

*To all whom it may concern:*

Be it known that we, F. MOREAU and F. ROBERT, of No. 57 Cedar street, in the city, county, and State of New York, have invented a new and Improved Apparatus for Marbling Soap; and we do hereby declare that the following is a full, clear, and exact description thereof, which will enable others skilled in the art to make and use the same, reference being had to the accompanying drawings, forming part of this specification, in which—

Figure 1:
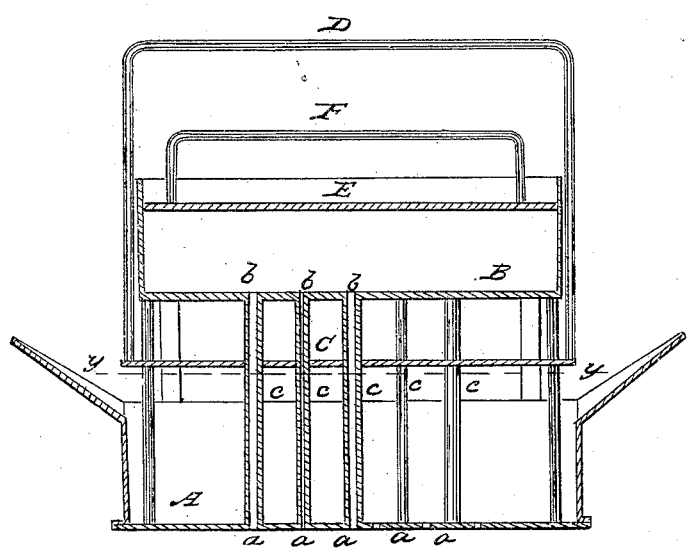
Figure 2:
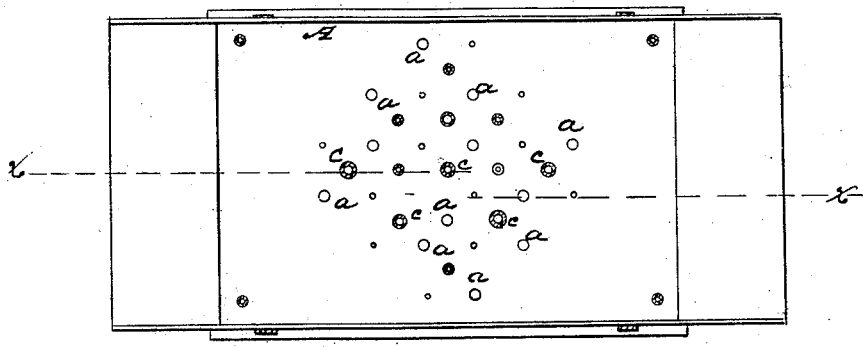
Figure 3:
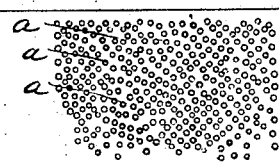

Figure 1 is a longitudinal vertical section of this invention, the line $x\,x$, Fig. 2, indicating the plane of section. Fig. 2 is a horizontal section of the same taken in the plane indicated by the line $y\,y$, Fig. 1. Fig. 3 is a partial inverted plan of the same in proper scale or proportion.

Similar letters of reference indicate like parts.

This invention relates to an apparatus for marbling soap which is composed of two pans of sheet metal or other suitable material, one placed under the other. The bottom of the lower pan is perforated with a large number of holes placed as close together as possible, and from one-sixteenth ($\frac{1}{16}$) to two-sixteenths ($\frac{2}{16}$) of an inch in diameter. The bottom of the upper pan is also perforated with one-half as many holes as that in the bottom of the lower pan, and the holes in the upper pan are connected to those in the lower pan by pipes of copper or other suitable material perfectly smooth and round in such a manner that the contents of the upper pan when discharging pass through those of the lower pan without mixing with the same. A plate of metal or other suitable material which is fitted over the pipes in the lower pan serves to exert a pressure, whereby the discharge of the paste is facilitated, and a similar plate, which, however, is not perforated, serves to exert a pressure on the contents of the upper pan. The holes and orifices of the pipes in the bottom of the lower pan have to be closed by a suitable slide.

A represents the lower pan, the bottom of which is perforated with a series of holes, $a$.

B is the upper pan, equal in size and shape to the pan A, or nearly so, and having its bottom perforated with a series of holes, $b$, equal in number to one-half that of the holes in the bottom of the pan A. The pan B is situated above the pan A, and the holes $b$ connect with the holes $a$ by means of pipes $c$, as shown clearly in Fig. 1 of the drawings, each alternate hole in the bottom of the pan A being connected to one of the holes $b$ in the bottom of the pan B.

C is a plate, of sheet metal, which is perforated with a series of holes equal in number, size, and position to the pipes $c$, and said plate is made to fit nicely in the pan A and over the pipes $c$, as shown in the drawings. A handle, D, serves to raise and lower the same. A similar plate, E, but not perforated, is fitted into the upper pan, B, and a handle, F, serves to raise and depress this plate. A suitable slide must be applied to close the holes and orifices in the bottom of the pan A.

The operation is as follows: The soap paste is divided in two parts, one containing two-fifths ($\frac{2}{5}$) and the other three-fifths ($\frac{3}{5}$) of the whole mass. The latter part is converted into a blue soap by means of ferrocyanide of aluminum or any other suitable pigment. After the blue soap has been prepared it is poured in the lower pan, A, and the white soap is placed in the upper pan, B. The slide or gate, closing the holes $a$, is opened and a certain pressure is exerted on both plates C and E. The paste, which is yet in a semi-liquid state, discharges in a suitable reservoir under the pan A, and a perfect mixture of white and blue soap is obtained, equal in every respect to the soap of Marseilles. In this state the mixture has not yet passed into the state of acid fat, and, in order to effect this purpose, it is only necessary to expose the same for about six (6) days (more or less) to the influence of the atmospheric air. During that time the iron in the ferrocyanide is brought to its minimum of oxidation, and the blue color of the soap turns red precisely like the soap of Marseilles. After the soap thus prepared has been poured in the mold it is left to stand until it assumes the proper consistency to be cut in cubical blocks, which takes place after a lapse of twenty-four (24) hours. After having been cut the soap is soaked, which is effected by placing it for four (4) or five (5) days in a vessel containing a lye brought to a strength of eight (8) degrees by a solution of chloride of sodium and afterward ten (10) degrees by a solution of oxide of sodium. After having been soaked the soap is placed on suitable racks to dry for about two (2) days and it is ready for commerce.

We claim as new and desire to secure by Letters Patent—

The use of two pans, A B, with holes $a$ $b$ in their bottoms, and connected by pipes $c$, in combination with plates C E, constructed and operating substantially as and for the purpose set forth.

F. MOREAU.
FRED ROBERT.

Witnesses:
M. M. LIVINGSTON,
C. KARVAL.